(12) United States Patent
Lee et al.

(10) Patent No.: US 8,030,380 B2
(45) Date of Patent: Oct. 4, 2011

(54) NON-HALOGEN FLAMEPROOF POLYCARBONATE RESIN COMPOSITION

(75) Inventors: Min Soo Lee, Ansan-si (KR); Beom Jun Joo, Seoul (KR); Sang Hyun Hong, Seoul (KR); Byun Kun Lee, Gunpo-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/776,609

(22) Filed: May 10, 2010

(65) Prior Publication Data

US 2010/0216922 A1    Aug. 26, 2010

Related U.S. Application Data

(63) Continuation-in-part of application No. PCT/KR2007/007014, filed on Dec. 31, 2007.

(30) Foreign Application Priority Data

Nov. 19, 2007    (KR) .................. 10-2007-0117717

(51) Int. Cl.
*C08K 5/49* (2006.01)
(52) U.S. Cl. ........ 524/117; 524/107; 524/108; 524/136; 524/139; 524/140; 524/141
(58) Field of Classification Search .................. 524/117, 524/141, 107, 108, 136, 139, 140
See application file for complete search history.

(56) References Cited

U.S. PATENT DOCUMENTS

| | | | |
|---|---|---|---|
| 4,178,281 A | 12/1979 | Horn, Jr. | |
| 4,692,488 A | 9/1987 | Kress et al. | |
| 5,061,745 A | 10/1991 | Wittmann et al. | |
| 5,292,786 A | 3/1994 | Gaggar et al. | |
| 5,864,004 A | 1/1999 | Kim et al. | |
| 5,952,408 A | 9/1999 | Lee et al. | |
| 6,417,256 B1 | 7/2002 | Eckel et al. | |
| 6,528,561 B1 | 3/2003 | Zobel et al. | |
| 6,737,465 B2 | 5/2004 | Seidel et al. | |
| 6,939,905 B2 | 9/2005 | Seidel et al. | |
| 2007/0155875 A1* | 7/2007 | Ku et al. ...................... | 524/117 |
| 2007/0197696 A1* | 8/2007 | Mediratta et al. ............. | 524/115 |

FOREIGN PATENT DOCUMENTS

| | | |
|---|---|---|
| JP | 11199721 | 7/1999 |
| JP | 2004-018765 A | 1/2004 |
| KR | 10-1998-0066133 A | 10/1998 |
| KR | 10-1998-0079379 A | 11/1998 |
| KR | 10-2001-0009104 A | 2/2001 |
| KR | 10-2001-0037631 A | 5/2001 |
| KR | 10-2002-0029393 A | 4/2002 |
| WO | 2009/066830 A1 | 5/2009 |

OTHER PUBLICATIONS

International Search Report in counterpart International Application No. PCT/KR2007/007014, dated Jul. 28, 2008.
European Search Report in counterpart European Application No. 07860791 dated Feb. 16, 2011, pp. 1-4.

* cited by examiner

*Primary Examiner* — David W Wu
*Assistant Examiner* — Marie Reddick
(74) *Attorney, Agent, or Firm* — Summa, Additon & Ashe, P.A.

(57) ABSTRACT

A non-halogen flameproof polycarbonate resin composition is disclosed. The polycarbonate resin composition includes a base resin including (A) about 50 to about 100% by weight of a polycarbonate resin, (B) about 0 to about 50% by weight of a rubber modified aromatic vinyl resin, and (C) about 0 to about 50% by weight of an alkyl(meth)acrylate resin; and (D) about 0.5 to about 30 parts by weight of a cyclic t-butyl phosphonate compound, based on about 100 parts by weight of the base resin comprising (A), (B) and (C). The polycarbonate resin composition can have stability against fire and can be environmentally friendly since it does not contain a halogen flame retardant.

9 Claims, No Drawings

NON-HALOGEN FLAMEPROOF POLYCARBONATE RESIN COMPOSITION

CROSS-REFERENCE TO RELATED APPLICATIONS

This application is a continuation-in-part of International Application No. PCT/KR2007/007014, filed Dec. 31, 2007, pending, which designates the U.S., published as WO 2009/066830, and is incorporated herein by reference in its entirety, and claims priority therefrom under 35 USC Section 120. This application also claims priority under 35 USC Section 119 from Korean Patent Application No. 10-2007-0117717, filed Nov. 19, 2007, in the Korean Intellectual Property Office, the entire disclosure of which is also incorporated herein by reference.

FIELD OF THE INVENTION

The present invention relates to a non-halogen flameproof polycarbonate resin composition.

BACKGROUND OF THE INVENTION

Generally, polycarbonate/styrene containing copolymer blends are resin mixtures which have good processability and high impact strength. Therefore, polycarbonate/styrene containing copolymer blends have been widely used in large injection molded products, such as computer housings or other office supplies, which emit a lot of heat. Accordingly, flame retardancy, heat resistance and high mechanical strength are important factors that should be considered when manufacturing the blend.

Halogen-containing flame retardants and antimony compounds are conventionally used to impart flame retardancy to the resin composition. However, when a halogen-containing flame retardant is used, it can produce very toxic gases during combustion. Therefore, the demand for the resin without halogen flame retardants is increasing. One well known and widely used method for imparting flame retardancy without using halogen-containing flame retardants is to use a phosphate ester flame retardant.

U.S. Pat. No. 4,692,488 discloses thermoplastic resin compositions containing a non-halogen aromatic polycarbonate resin, a non-halogen styrene-acrylonitrile copolymer, a non-halogen phosphorous compound, tetrafluoroethylene polymer, and a small amount of ABS copolymer.

U.S. Pat. No. 5,061,745 discloses a flame retardant resin composition containing an aromatic polycarbonate resin, an ABS graft copolymer, a copolymer and a monomeric phosphate ester.

However, the resin compositions described above have a disadvantage in that it is necessary to add an excessive amount of phosphate ester flame retardant in order to obtain a certain level of flame retardancy.

A large amount of flame retardant also needs to be added to impart flame retardancy to blends of polycarbonate resin and polymethyl methacrylate resin, due to the lack of flame retardancy of polymethylmethacrylate resin. The amount of polymethylmethacrylate resin may be decreased to try to improve flame retardancy, but reducing the amount of polymethylmethacrylate resin may also decrease scratch resistance.

U.S. Pat. No. 5,292,786 discloses a composition having good weld line strength by using a phosphoric ester compound as a flame retardant and by further adding a polymethylmethacrylate resin to a polycarbonate resin and a styrenic resin. However, it is difficult to obtain improved scratch resistance and flame retardancy, since the amount of a polymethylmethacrylate resin which contributes to the property of scratch resistance is relatively small, in addition to the fact that polycarbonate resin and styrenic resin do not have good scratch resistance.

Japanese Patent Laid-Open No. 1999-199721 discloses a flame retardant resin composition which obtains flame retardancy from cyclic phosphonate added as a flame retardant to a blend of polypropylene resin and thermoplastic resin containing nitrogen atoms. However, it fails to disclose a flame retardant method for a polycarbonate resin and polycarbonate resin-based blend.

SUMMARY OF THE INVENTION

Accordingly, the present inventors have developed a flameproof polycarbonate resin composition which can be environmentally friendly without creating environmental pollution, and which also can have stability against fire, by adding cyclic t-butyl phosphonate as a flame retardant to a base resin comprising a polycarbonate resin or a blend of polycarbonate resin and rubber modified aromatic vinyl resin or alkyl(meth)acrylate resin.

The present invention thus can provide a thermoplastic flameproof polycarbonate resin composition having stability against fire. The present invention can also provide an environmentally friendly non-halogen flameproof polycarbonate resin composition which does not use a halogen-containing flame retardant that can generate toxic pollutants during the preparation or combustion of the resin composition.

In addition, the present invention can provide a flame retardant polycarbonate resin composition having good flame retardancy in a base resin including a polycarbonate resin or a blend of polycarbonate resin and a rubber modified aromatic vinyl resin or an alkyl(meth)acrylate resin.

Further, the present invention can provide a flame retardant polycarbonate resin composition exhibiting good flame retardancy even when a small amount of flame retardant used therein.

Still further, the present invention can provide a flame retardant polycarbonate resin composition exhibiting good impact strength and good scratch resistance by adding a rubber modified aromatic vinyl resin or an alkyl(meth)acrylate resin to a polycarbonate resin.

The non-halogen flameproof polycarbonate resin composition of the present invention includes a base resin comprising (A) about 50 to about 100% by weight of a polycarbonate resin, (B) about 0 to about 50% by weight of a rubber modified aromatic vinyl resin, and (C) about 0 to about 50% by weight of an alkyl(meth)acrylate resin; and (D) about 0.5 to about 30 parts by weight of a cyclic t-butyl phosphonate compound, based on about 100 parts by weight of the base resin comprising (A), (B) and (C).

The resin composition may further comprise an aromatic phosphoric ester compound (E). The amount of aromatic phosphoric ester compound (E) may range from about 0.0001 parts by weight to about 20 parts by weight, based on about 100 parts by weight of the base resin comprising (A), (B) and (C).

Also, the flame retardant resin composition of the present invention may further include other additives such as heat stabilizers, anti-dripping agents, antioxidants, compatibilizers, light-stabilizers, pigments, dyes, inorganic fillers and the like.

The present invention provides molded articles produced by the resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polycarbonate Resin

Any polycarbonate resin known in the art can be used as the polycarbonate resin (A) of the present invention. Polycarbonate resins useful in the invention are commercially available. In an exemplary embodiment, the polycarbonate resin (A) may be prepared by reacting a diphenol represented by chemical formula 3 shown below with a phosgene, halogen formate or a carbonic diester.

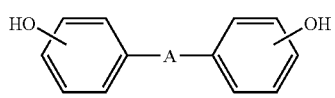

[Chemical Formula 3]

wherein A is a single bond, a $C_{1-5}$ alkylene group, a $C_{1-5}$ alkylidene group, a $C_{5-6}$ cycloalkylidene group, —S— or —$SO_2$—.

Examples of diphenol of chemical formula 3 may include without limitation hydroquinol, resorcinol, 4,4'-dihydroxy diphenyl, 2,2-bis-(4-hydroxyphenyl)-propane, 2,4-bis-(4-hydroxyphenyl)-2-methyl butane, 1,1-bis-(4-hydroxyphenyl)-cyclohexane, 2,2-bis-(3-chloro-4-hyroxyphenyl)-propane, 2,2-bis-(3,5-dichloro-4-hydroxyphenyl)-propane, and the like, and combinations thereof. In exemplary embodiments of the invention, the diphenol can include 2,2-bis-(4-hydroxyphenyl)-propane (also referred to as "bisphenol A"), 2,2-bis-(3,5-dichloro-4-hydroxyphenyl)-propane, and 1,1-bis-(4-hydroxyphenyl)-cyclohexane. The polycarbonate suitable for the preparation of the resin composition according to the present invention may have a weight average molecular weight (Mw) of about 10,000 to about 200,000, for example about 15,000 to about 80,000.

In accordance with various embodiments of the invention, suitable polycarbonates incorporated into the composition of the present invention may be branched in a known manner. For example, such branched polycarbonates can be prepared by incorporating about 0.05 to about 2 mol %, based on the total quantity of diphenols used, of tri- or higher functional compounds, for example, those with three or more phenolic groups.

A homopolymer of polycarbonate, a copolymer of polycarbonate or a mixture thereof may be used in this invention.

Some portion of the polycarbonate resin may be replaced with an aromatic polyester-carbonate resin that can be obtained by polymerization in the presence of an ester precursor, such as difunctional carboxylic acid.

In the present invention, the polycarbonate resin may be employed in an amount of about 50 to about 100% by weight, based on 100% by weight of the base resin including (A), (B), and (C). In some embodiments, the polycarbonate resin may be may be used in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% by weight, based on 100% by weight of the base resin including resins (A), (B), and (C).

(B) Rubber Modified Aromatic Vinyl Resin

The rubber modified aromatic vinyl resin according to exemplary embodiments of the invention is a polymer in which rubbery polymers are dispersed in a matrix (continuous phase) including aromatic vinyl polymers.

The rubber modified aromatic vinyl resins can be obtained, for example, by polymerizing an aromatic vinyl monomer and a vinyl group-containing monomer that can be polymerized with the aromatic vinyl monomer in the presence of a rubbery polymer. These rubber modified aromatic vinyl resins can be prepared by known methods such as emulsion polymerization, suspension polymerization, bulk polymerization, or solution polymerization.

In exemplary embodiments, the rubber modified aromatic vinyl resin is produced by preparing separately a graft copolymer resin ($B_1$) typically having high rubber content and an aromatic vinyl copolymer resin ($B_2$) which does not contain rubber and mixing them together. In a bulk polymerization, the rubber modified aromatic vinyl resin can be prepared in one process without separately preparing the graft copolymer resin ($B_1$) and the aromatic vinyl copolymer resin ($B_2$).

In either case, the rubber content in a final rubber modified aromatic vinyl resin (B) may be about 5 to about 30% by weight. Examples of the rubber modified aromatic vinyl resin may include acrylonitrile-butadiene-styrene (ABS) copolymer resin, acrylonitrile-acryl rubber-styrene (AAS) copolymer resin, acrylonitrile-ethylene propylene rubber-styrene (AES) copolymer resin, and the like, and mixtures thereof.

In the rubber modified aromatic vinyl resin (B), a graft copolymer resin can be used alone or in combination with an aromatic vinyl copolymer resin taking into account the compatibility thereof. In exemplary embodiments of the invention, the rubber modified aromatic vinyl resin (B) comprises about 20 to about 100% by weight of the graft copolymer resin ($B_1$) and about 0 to about 80% by weight of the aromatic vinyl copolymer resin ($B_2$).

In the present invention, the rubber modified aromatic vinyl resin (B) may be employed in an amount of about 0 to about 50% by weight, based on 100% by weight of the base resin including (A), (B), and (C). In some embodiments, the rubber modified aromatic vinyl resin (B) may not be present (0 amount) or may be used in an amount greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight, based on 100% by weight of the base resin including resins (A), (B), and (C).

($B_1$) Graft Copolymer Resin

In exemplary embodiments of the present invention, the graft copolymer resin ($B_1$) may be prepared by adding an aromatic vinyl monomer and a monomer copolymerizable with the aromatic vinyl monomer to a rubbery polymer and polymerizing them together.

Examples of the rubbery polymer for preparing the graft copolymer resin may include without limitation diene-rubbers such as polybutadiene, poly(styrene-butadiene), poly(acrylonitrile-butadiene) and the like; saturated rubbers in which hydrogen is added to the diene rubbers; isoprene rubbers; chloroprene rubbers; acrylic rubbers such as polyacrylic acid butyl; ethylene-propylene rubbers; ethylene-propylene-diene terpolymers (EPDM); and the like. The rubbers may be used alone or in combination with one another. In exemplary embodiments, a diene rubber, such as a butadiene rubber, can be used. In the present invention, the rubber may be used in an amount of about 4 to about 65% by weight, based on the total weight of the graft copolymer resin ($B_1$). In exemplary embodiments, the rubber can have a particle size of about 0.1 to about 4.0 μm, taking into account impact strength and appearance.

Examples of the aromatic vinyl monomers may include without limitation a styrenic monomer, such as styrene, α-methyl styrene, or p-methyl styrene. The styrenic monomer can be used alone or in combination with one another. The aromatic vinyl monomer is used in an amount of about 30 to about 95% by weight, based on the total weight of the graft copolymer resin ($B_1$).

In exemplary embodiments, at least one monomer copolymerizable with the aromatic vinyl monomers may also be employed. The monomers which may be copolymerized with the aromatic vinyl monomers may include unsaturated nitrile-containing compounds such as acrylonitrile or methacrylonitrile. The unsaturated nitrile-containing compounds may be used alone or in combination with one another. The monomer copolymerizable with the aromatic vinyl monomer may be used in an amount of about 1 to about 20% by weight based on the total weight of the graft copolymer resin ($B_1$).

In some embodiments, the graft copolymer resin may also include other monomers such as acrylic acid, methacrylic acid, maleic anhydride, N-substituted maleimide, and the like, in order to impart good processability and heat resistance. The monomers can be used alone or in combination with one another. The amount added can be in the range of about 0 to about 15% by weight, based on the total weight of the graft copolymer resin ($B_1$).

($B_2$) Copolymer Resin

The copolymer resin of the present invention may be prepared by copolymerizing aromatic vinyl monomer and monomer copolymerizable with the aromatic vinyl monomer.

Examples of the aromatic vinyl monomer may include without limitation styrene, α-methyl styrene, p-methyl styrene, and the like. The styrenic monomer can be used alone or in combination with one another. In exemplary, the aromatic vinyl monomer is used in an amount of about 60 to about 90% by weight, based on the total weight of the copolymer resin ($B_2$).

The monomer copolymerizable with the aromatic vinyl monomer can include without limitation unsaturated nitrile-containing compounds such as acrylonitrile or methylmethacrylonitrile. The unsaturated nitrile-containing compounds may be used alone or in combination with one another. The copolymerizable monomer may be used in an amount of about 10 to about 40% by weight, based on the total weight of the copolymer resin ($B_2$).

In some embodiments, the copolymer resin may also include other monomers such as acrylic acid, methacrylic acid, maleic anhydride, N-substituted maleimide, and the like, and combinations thereof, in order to impart good processability and heat resistance. The amounts of the monomers can be about 0 to about 30% by weight, based on the total weight of the copolymer resin ($B_2$).

(C) Alkyl(meth)acrylate Resin

In the present invention, alkyl(meth)acrylate resin can be optionally added to the base resin to provide scratch resistance.

The alkyl(meth)acrylate resin includes homopolymers of methyl methacrylate; copolymers comprising at least two members selected from alkyl acrylates and/or alkyl methacrylates; or mixtures thereof. Alkyl(meth)acrylate resins useful in the invention are commercially available or can be produced by methods well known in the art.

In exemplary embodiments, the alkyl(meth)acrylate resin may be a (co)polymer comprising about 50 to about 100% by weight of methylmethacrylate and about 0 to about 50% by weight of an alkyl(meth)acrylate selected from the group consisting of $C_{1-10}$ alkylacrylates. $C_{1-10}$ alkylmethacrylates (which is different from methylmethacrylate), and combinations thereof.

In some embodiments, the alkyl(meth)acrylate resin (C) may be a (co)polymer comprising about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% by weight of methylmethacrylate. In some embodiments, the alkyl(meth)acrylate selected from the group consisting of $C_{1-10}$ alkylacrylates, $C_{1-10}$ alkylmethacrylates, and combinations thereof may not be present in the copolymer (0 amount) or may be used in the copolymer in an amount greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight.

In exemplary embodiments, the alkyl(meth)acrylate resin is polymethylmethacrylate (PMMA) (i.e., 100% by weight PMMA).

In the present invention, the alkyl(meth)acrylate resin may be employed in an amount of about 0 to about 50% by weight, for example about 10 to about 50% by weight, based on 100% by weight of the base resin including (A), (B), and (C). In some embodiments, the alkyl(meth)acrylate resin (C) may not be present (0 amount) or may be used in an amount greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight, based on 100% by weight of the base resin including resins (A), (B), and (C). If more than about 50% by weight of resin (C) is used, flame retardancy may be so lowered that desirable flame retardancy cannot be achieved with a phosphorus-containing flame retardant.

(D) Cyclic t-butyl Phosphonate

The cyclic t-butyl phosphonate compounds of the present invention may impart good flame retardancy to a base resin of polycarbonate. The cyclic t-butyl phosphonate compounds are represented by the following chemical formula 1.

[Chemical Formula 1]

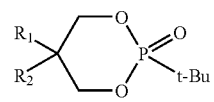

wherein $R_1$ and $R_2$ are each independently hydrogen, $C_1$-$C_6$ alkyl or $C_6$-$C_{10}$ aryl.

The cyclic t-butyl phosphonate may be prepared by reflux reacting t-butyl phosphonic dichloride with diol-based compound in the presence of a base.

In an embodiment, one equivalent of the t-butyl phosphonic dichloride is applied to one equivalent of the diol-based compound and refluxed at about 80° C. to about 200° C., for example about 100° C. to about 150° C. for about 5 to about 20 hours, for example for about 7 to about 15 hours in the presence of base and solvent. The base may be triethylamine and the solvent may be a conventional organic solvent such as toluene.

The cyclic t-butyl phosphonate compound is used in an amount of about 0.5 to about 30 parts by weight, for example about 1 part by weight to about 20 parts by weight, as another example about 1 part by weight to about 10 parts by weight, and as yet another example about 1 part by weight to about 5 parts by weight, based on about 100 parts by weight of the base resin including (A), (B), and (C). In some embodiments, the cyclic t-butyl phosphonate may be used in an amount of about 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight, based on about 100 parts by weight of the base resin including resins (A), (B), and (C). When the cyclic t-butyl phosphonate is used in an amount more than about 30 parts by weight, the mechanical properties of the resin composition may decrease due to the decomposition of polycarbonate.

(E) Aromatic Phosphoric Ester Compound

The flame retardant resin composition of the present invention may optionally further include aromatic phosphoric ester compounds (E).

When using the cyclic t-butyl phosphonate compounds and aromatic phosphoric ester compounds together, the flame retardancy may be improved even with a small amount while also maintaining a good balance of physical properties such as impact strength.

The aromatic phosphoric ester compounds are represented by the following chemical formula 2.

[Chemical Formula 2]

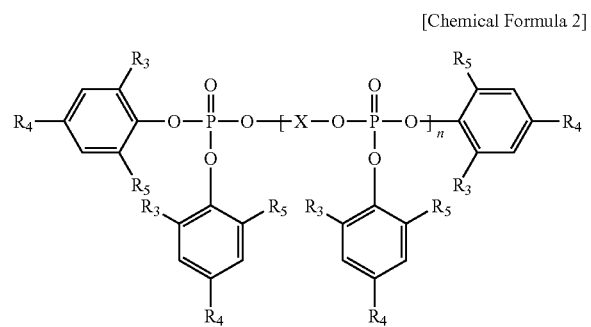

wherein $R_3$, $R_4$, and $R_5$ are each independently hydrogen or $C_1$-$C_4$ alkyl, X is $C_6$-$C_{20}$ aryl or $C_1$-$C_4$ alkyl-substituted $C_6$-$C_{20}$ aryl; and, n is about 0 to about 4.

In the above formula, X can be a derivative of a dialcohol such as resorcinol, hydroquinol, bisphenol-A and the like. Where n is 0, compounds represented by chemical formula 2 can include triphenyl phosphate, tri(2,6-dimethyl)phosphate, and the like, and where n is 1, compounds represented by chemical formula 2 can include resorcinol bis(diphenyl) phosphate, resorcinol bis(2,6-dimethyl phenyl)phosphate, resorcinol bis(2,4-ditertiary butyl phenyl)phosphate, hydroquinol bis(2,6-dimethyl phenyl)phosphate, hydroquinol bis (2,4-ditertiary butyl phenyl)phosphate, and the like. The aromatic phosphoric ester compound (E) can be used alone or in combination with one another.

The aromatic phosphoric ester compound (E) can be used in an amount of about 20 parts by weight or less, for example about 0.0001 to about 20 parts by weight, as another example about 1 part by weight to about 20 parts by weight, and as yet another example about 5 to about 18 parts by weight, based on about 100 parts by weight of the base resin including (A), (B), and (C). In some embodiments, the aromatic phosphoric ester compound (E) may not be present (0 amount) or may be used in an amount greater than and/or about 0, 1, 2, 3, 4, 5, 6, 7, 8, 9, 10, 11, 12, 13, 14, 15, 16, 17, 18, 19, or 20 parts by weight, based on about 100 parts by weight of the base resin including resins (A), (B), and (C).

The resin composition according to the present invention may further include other additives depending on its use. Examples of such additives may include without limitation plasticizers, heat stabilizers, anti-dripping agents, antioxidants, compatibilizers, light-stabilizers, pigments, dyes, and/ or inorganic fillers and the like. The additives can be used alone or in combination with one another. Examples of the inorganic fillers include asbestos, glass fibers, talc, ceramic, sulfates, and the like, and combinations thereof. The additives can be added in an amount of about 30 parts by weight or less, for example about 1 part by weight to about 25 parts by weight, based on about 100 parts by weight of the base resin including (A), (B), and (C). In some embodiments, the additives may not be present (0 amount) or may be used in an amount greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight, based on about 100 parts by weight of the base resin including resins (A), (B), and (C).

The resin composition of the present invention can be prepared by conventional methods. For example, all the components and additives can be mixed together and extruded through an extruder and can be prepared in the form of pellets. The pellets can be molded by conventional methods to form housings of electric/electronic goods such as computers, televisions, audio systems, CD players, cassette player, telephones, radios, washing machines, drying machines, air conditioners and the like or inner/outer parts of office automation equipment. The resin composition of the invention is suitable for the housings of electronic goods because it has good flame retardancy, impact strength and scratch resistance.

The invention may be better understood by reference to the following examples which are intended for the purpose of illustration and are not to be construed as in any way limiting the scope of the present invention, which is defined in the claims appended hereto.

EXAMPLES

Each component used in the following examples and comparative examples is as follows.

(A) Polycarbonate Resin

Bisphenol-A based polycarbonate with a weight average molecular weight of 25,000 (Mw) is used.

(B) Rubber Modified Aromatic Vinyl Resin (B1) Graft Copolymer Resin 50 parts of butadiene rubber latex, 36 parts of styrene, 14 parts of acrylonitrile, and 150 parts of deionized water are mixed. To the mixture, 1.0 part of potassium oleate, 0.4 parts of cumen hydroperoxide, 0.2 parts of mercaptan-containing chain transfer agent, 0.4 parts of glucose, 0.01 parts of ferrous sulfate hydrate, and 0.3 parts of sodium pyrophosphate are added. The blend is kept at 75° C. for 5 hours to obtain g-ABS latex. To the g-ABS latex, 0.4 parts of sulfuric acid is added, coagulated and dried to obtain rubber modified polystyrene resin (g-ABS) in a powder form.

(B2) Copolymer Resin 75 parts of styrene, 25 parts of acrylonitrile, and 120 parts of deionized water are mixed. To the mixture, 0.2 parts of azobisisobutylonitrile (AIBN), 0.4 parts of tricalciumphosphate and 0.2 parts of mercaptan-containing chain transfer agent are added. The resultant solution is heated to 80° C. for 90 minutes and kept for 180 minutes. The resultant product is washed, dehydrated and dried to obtain styrene-acrylonitrile copolymer (SAN) in a powder form. The styrene-acrylonitrile copolymer (SAN) has a weight average molecular weight (Mw) of about 80,000 to about 100,000.

(C) Polymethylmethacrylate Resin

PMMA IH 830 Grade manufactured by LG Chemical Co. of South Korea is used.

(d1) Cyclic t-butyl Phosphonate

Aluminum chloride (130 g, 1.0 mol) and dichloromethane (200 mL) are added into a vessel and stirred with dropwise addition of phosphorus trichloride (140 g, 1.0 mol) at room temperature for 1 hour. The temperature of the vessel is lowered to 0° C. and t-butyl chloride (93 g, 1.0 mol) is dropwise added with stirring under a nitrogen atmosphere. After the completion of the dropping, the mixture is further stirred for 12 hours at room temperature to form a slurry. The resulting mixture is added with chloroform (200 mL), stirred and followed by addition of diluted HCl (400 mL) and stirring. Then the organic layer is taken and evaporated under reduced pressure to obtain t-butyl phosphonic dichloride. Then, an equivalent of the t-butyl phosphonic dichloride and 2,2-methylpropanediol respectively, two equivalent of triethylamine, and 200 ml of toluene are charged into a vessel and refluxed at 130° C. for 10 hours. After the completion of the reaction, ethyl acetate (100 ml) and water (200 ml) are added to the vessel and stirred until solid has disappeared. Then the organic layer is taken and evaporated under reduced pressure to obtain cyclic t-butyl phosphonate with 99% or more purity and 50% yield.

(d2) Cyclic Phenyl Phosphonate

Cyclic phenyl phosphonate with 99% or more purity and 50% yield is obtained to by the same procedure as (d1) except using phenyl chloride instead of t-butyl chloride.

(d3) Cyclic Methyl Phosphonate

Cyclic methyl phosphonate with 99% or more purity and 50% yield is obtained by the same procedure as (d1) except using methyl chloride instead of t-butyl chloride.

(d4) Cyclic n-butyl Phosphonate

Cyclic n-butyl phosphonatet-butylchloride with 99% or more purity and 50% yield is obtained by the same procedure as (d1) except using n-butyl chloride instead of t-butyl chloride.

(E) Aromatic Phosphoric Ester Compound

Tetra-2,6-dimethyl phenyl resorcinol diphosphate made by Daihachi Chemical Industry Co., Ltd. of Japan (product name: PX-200) is used.

Examples 1-7

The components as shown in the following table 1 are added to a conventional mixer and the mixture is extruded through a conventional twin screw extruder at a temperature range of 200~280° C. to prepare pellets. The prepared pellets are dried at 80° C. for 2 hours and then molded into test specimens for flame retardancy in an injection molding machine at 180~280° C. with a mold temperature of 40~80° C. The flame retardancy is measured in accordance with UL 94 VB under a thickness of ⅛".

TABLE 1

|   |      | \multicolumn{7}{c}{Examples} |     |     |     |     |     |     |
|---|------|-----|-----|-----|-----|-----|-----|-----|
|   |      | 1   | 2   | 3   | 4   | 5   | 6   | 7   |
| (A) |    | 100 | 100 | 70  | 60  | 50  | 75  | 50  |
| (B) | (B1) | —   | —   | 10  | 12  | 15  | —   | —   |
|     | (B2) | —   | —   | 20  | 28  | 35  | —   | —   |
| (C) |    | —   | —   | —   | —   | —   | 25  | 50  |
| (D) | (d1) | 1   | 3   | 3   | 3   | 3   | 3   | 3   |
|     | (d2) | —   | —   | —   | —   | —   | —   | —   |
|     | (d3) | —   | —   | —   | —   | —   | —   | —   |
|     | (d4) | —   | —   | —   | —   | —   | —   | —   |
| (E) |    | —   | —   | 15  | 15  | 15  | 17  | 17  |
| UL94 flame retardancy (⅛") | | V-1 | V-0 | V-0 | V-0 | V-0 | V-0 | V-0 |

Comparative Examples 1-15

Comparative Examples 1-6 are prepared and evaluated in the same manner as in Examples 2-7 except that aromatic phosphoric ester compounds were used instead of cyclic t-butyl phosphonate compounds. Comparative Examples 7-15 are prepared and evaluated using cyclic phenyl phosphonate, cyclic methyl phosphonate, or cyclic n-butyl phosphonate instead of cyclic t-butyl phosphonate. The results of comparative Examples 1-6 and comparative examples 7-15 are shown in Table 2 and Table 3, respectively.

TABLE 2

|   |      | \multicolumn{6}{c}{Comparative examples} |     |     |     |     |     |
|---|------|-----|-----|-----|-----|-----|-----|
|   |      | 1   | 2   | 3   | 4   | 5   | 6   |
| (A) |    | 100 | 70  | 60  | 50  | 75  | 50  |
| (B) | (B1) | —   | 10  | 12  | 15  | —   | —   |
|     | (B2) | —   | 20  | 28  | 35  | —   | —   |
| (C) |    | —   | —   | —   | —   | 25  | 50  |
| (D) | (d1) | —   | —   | —   | —   | —   | —   |
|     | (d2) | —   | —   | —   | —   | —   | —   |
|     | (d3) | —   | —   | —   | —   | —   | —   |
|     | (d4) | —   | —   | —   | —   | —   | —   |
| (E) |    | 3   | 18  | 18  | 18  | 20  | 20  |
| UL94 flame retardancy (⅛") | | Fail | V-1 | V-1 | Fail | V-1 | Fail |

TABLE 3

|   |      | \multicolumn{9}{c}{Comparative examples} |     |     |     |     |     |     |     |     |
|---|------|-----|-----|-----|-----|-----|-----|-----|-----|-----|
|   |      | 7   | 8   | 9   | 10  | 11  | 12  | 13  | 14  | 15  |
| (A) |    | 100 | 50  | 50  | 100 | 50  | 50  | 100 | 50  | 50  |
| (B) | (B1) | —   | 15  | —   | —   | 15  | —   | —   | 15  | —   |
|     | (B2) | —   | 35  | —   | —   | 35  | —   | —   | 35  | —   |
| (C) |    | —   | —   | 50  | —   | —   | 50  | —   | —   | 50  |
| (D) | (d1) | —   | —   | —   | —   | —   | —   | —   | —   | —   |
|     | (d2) | 1   | 3   | 3   | —   | —   | —   | —   | —   | —   |
|     | (d3) | —   | —   | —   | 1   | 3   | 3   | —   | —   | —   |
|     | (d4) | —   | —   | —   | —   | —   | —   | 1   | 3   | 3   |

TABLE 3-continued

| | Comparative examples | | | | | | | | |
|---|---|---|---|---|---|---|---|---|---|
| | 7 | 8 | 9 | 10 | 11 | 12 | 13 | 14 | 15 |
| (E) | — | 15 | 17 | — | 15 | 17 | — | 15 | 17 |
| UL94 flame retardancy (1/8") | Fail | V-1 | Fail | V-2 | V-1 | V-1 | Fail | Fail | Fail |

As shown in Table 1, Table 2 and Table 3, it can be seen that Example 1 employing cyclic t-butyl phosphonate exhibits good flame retardancy even with a small amount of flame retardant, compared to Comparative Example 1 using aromatic phosphoric ester compound only as a flame retardant. Also, Examples 2-7 employing cyclic t-butyl phosphonate compound exhibit good flame retardancy at a thickness of 1/8", compared to Comparative Examples 1-6 using aromatic phosphoric ester compound only. In addition, Examples 1, 5 and 7 in which cyclic t-butyl phosphonate compounds are used exhibit good flame retardancy at a thickness of 1/8", compared to Comparative Examples 7-13 using cyclic phosphonate compounds having a phenyl, methyl, or n-butyl group instead of t-butyl group.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed:

1. A non-halogen flameproof polycarbonate resin composition comprising:
   a base resin comprising (A) about 50 to about 100% by weight of a polycarbonate resin, (B) about 0 to about 50% by weight of a rubber modified aromatic vinyl resin, (C) about 0 to about 50% by weight of an alkyl (meth)acrylate resin; and
   (D) about 0.5 to about 30 parts by weight of a cyclic t-butyl phosphonate compound, based on about 100 parts by weight of the base resin comprising (A), (B) and (C).

2. The non-halogen flameproof polycarbonate resin composition of claim 1, wherein said cyclic t-butyl phosphonate compound (D) is represented by the following Formula 1:

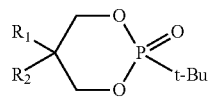

[Formula 1]

wherein $R_1$ and $R_2$ are each independently hydrogen, $C_1$-$C_6$ alkyl or $C_6$-$C_{10}$ aryl.

3. The non-halogen flameproof polycarbonate resin composition of claim 1, wherein said rubber modified aromatic vinyl resin (B) is a polymer in which a rubbery polymer is dispersed in a matrix comprising an aromatic vinyl polymer.

4. The non-halogen flameproof polycarbonate resin composition of claim 3, wherein said rubber modified aromatic vinyl resin (B) comprises ($B_1$) about 20 to about 100% by weight of a graft copolymer resin prepared by graft-polymerizing about 4 to about 65% by weight of a rubbery polymer, about 30 to about 95% by weight of an aromatic vinyl monomer, about 1 to about 20% by weight of a monomer copolymerizable with said aromatic vinyl monomer, and about 0 to about 15% by weight of a monomer providing processability and heat resistance; and ($B_2$) about 0 to about 80% by weight of a copolymer resin prepared by polymerizing about 60 to about 90% by weight of an aromatic vinyl monomer, about 10 to about 40% by weight of a monomer copolymerizable with said aromatic vinyl monomer, and about 0 to about 30% by weight of a monomer providing processability and heat resistance.

5. The non-halogen flameproof polycarbonate resin composition of claim 4, wherein said monomer copolymerizable with an aromatic vinyl monomer comprises an unsaturated nitrile-containing compound; and said monomer providing processability and heat resistance comprises acrylic acid, methacrylic acid, maleic anhydride, N-substituted maleimide or a mixture thereof.

6. The non-halogen flameproof polycarbonate resin composition of claim 1, further comprising about 0.0001 to about 20 parts by weight of an aromatic phosphoric ester compound (E), based on about 100 parts by weight of the base resin.

7. The non-halogen flameproof polycarbonate resin composition of claim 6, wherein said aromatic phosphoric ester compound (E) is represented by the following Formula 2:

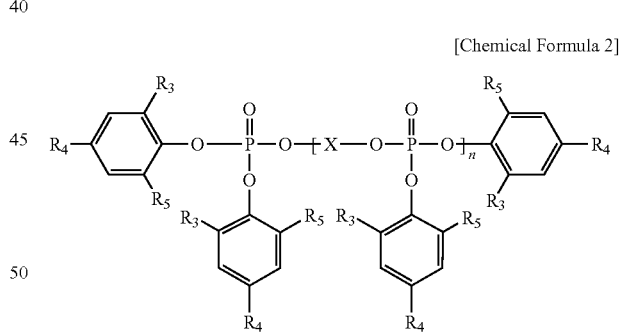

[Chemical Formula 2]

wherein $R_3$, $R_4$, and $R_5$ are each independently hydrogen or $C_1$-$C_4$ alkyl; X is $C_6$-$C_{20}$ aryl or $C_1$-$C_4$ alkyl-substituted $C_6$-$C_{20}$ aryl; and n is about 0 to about 4.

8. The non-halogen flameproof polycarbonate resin composition of claim 1, further comprising one or more additives selected from the group consisting of heat stabilizers, anti-dripping agents, antioxidants, compatibilizers, light-stabilizers, pigments, dyes, inorganic fillers and mixtures thereof.

9. A molded article molded from the non-halogen flameproof polycarbonate resin composition of claim 1.

* * * * *